(12) United States Patent
Herges

(10) Patent No.: US 9,157,543 B2
(45) Date of Patent: Oct. 13, 2015

(54) PARKING BRAKE DEVICE

(75) Inventor: Michael Herges, Munich (DE)

(73) Assignee: KNORR-BREMSE SYSTEME FUER NUTZFAHRZEUGE GMBH, Munich (DE)

(*) Notice: Subject to any disclaimer, the term of this patent is extended or adjusted under 35 U.S.C. 154(b) by 0 days.

(21) Appl. No.: 14/116,565

(22) PCT Filed: May 11, 2012

(86) PCT No.: PCT/EP2012/058757
§ 371 (c)(1),
(2), (4) Date: Dec. 27, 2013

(87) PCT Pub. No.: WO2012/156306
PCT Pub. Date: Nov. 22, 2012

(65) Prior Publication Data
US 2014/0103237 A1 Apr. 17, 2014

(30) Foreign Application Priority Data
May 13, 2011 (DE) .................. 10 2011 101 438

(51) Int. Cl.
B60T 8/34 (2006.01)
F16K 31/02 (2006.01)
(Continued)

(52) U.S. Cl.
CPC . *F16K 31/02* (2013.01); *B60T 7/20* (2013.01); *B60T 13/263* (2013.01); *B60T 13/662* (2013.01); *B60T 13/683* (2013.01); *B60T 15/181* (2013.01);
(Continued)

(58) Field of Classification Search
USPC ........... 303/3, 7, 8, 9.76, 14, 15, 40, 45, 84.2, 303/118.1, 123, 127; 137/625.25, 137/625.37–625.39, 625.66, 625.67
See application file for complete search history.

(56) References Cited

U.S. PATENT DOCUMENTS 4,121,873 A 10/1978 Durling
4,223,953 A * 9/1980 Cruse ................................ 303/2
(Continued)

FOREIGN PATENT DOCUMENTS

DE 2 748 141 5/1978
DE 103 36 611 3/2005
(Continued)

OTHER PUBLICATIONS

Bosch, Kraftfahrttechnisches Taschenbuch (Automotive Handbook), 22nd German Edition, Duesseldorf, 1995, p. 648.
(Continued)

Primary Examiner — Christopher Schwartz
(74) Attorney, Agent, or Firm — Kenyon & Kenyon LLP

(57) ABSTRACT

A parking brake device having a bistable parking brake valve, a relay valve, a spring brake and electrically actuable valves, the electrically actuable valves being selectively connectable to the parking brake valve to supply pressure or atmospheric pressure, an outlet of the parking brake valve controls the relay valve, and the relay valve controls the spring brake, in which the parking brake valve has a movable piston, which is loaded by a spring and has two coaxial piston faces which delimit a first space and a second space, in which supply pressure, atmospheric pressure or a pressure which lies between them and which can be fed to the outlet of the parking brake valve can be supplied to the first space in accordance with the position of the piston, and in which the second space can be selectively connected to supply pressure or atmospheric pressure by an electrically actuable valve.

20 Claims, 14 Drawing Sheets

(51) Int. Cl.
  *B60T 7/20*   (2006.01)
  *B60T 13/66*  (2006.01)
  *B60T 13/68*  (2006.01)
  *B60T 15/18*  (2006.01)
  *B60T 17/04*  (2006.01)
  *B60T 17/22*  (2006.01)
  *B60T 13/26*  (2006.01)

(52) U.S. Cl.
  CPC .............. *B60T 15/182* (2013.01); *B60T 17/04* (2013.01); *B60T 17/221* (2013.01)

(56) References Cited

U.S. PATENT DOCUMENTS

| | | | |
|---|---|---|---|
| 6,270,168 B1 * | 8/2001 | McCann | 303/77 |
| 8,864,245 B2 * | 10/2014 | Schnittger et al. | 303/118.1 |
| 8,926,026 B2 * | 1/2015 | Vuckovic | 303/3 |
| 2005/0029859 A1 | 2/2005 | Bensch et al. | |
| 2007/0164602 A1 * | 7/2007 | Haffelder et al. | 303/3 |
| 2008/0258542 A1 * | 10/2008 | Soupal | 303/7 |
| 2010/0025141 A1 | 2/2010 | Bensch et al. | |

FOREIGN PATENT DOCUMENTS

| | | |
|---|---|---|
| DE | 10 2005 058799 | 6/2007 |
| DE | 10 2007 008504 | 8/2008 |
| DE | 10 2007 016335 | 10/2008 |
| DE | 10 2007 047691 | 4/2009 |
| DE | 10 2008 007709 | 8/2009 |
| DE | 10 2008 007877 | 11/2009 |
| DE | 10 2007 061908 | 1/2010 |
| DE | 10 2009 059816 | 4/2011 |
| DE | 10 2011 101438 | 11/2012 |
| EP | 2 058 186 | 5/2009 |
| EP | 2 058 193 | 5/2009 |
| EP | 2 133 250 | 12/2009 |
| EP | 2 238 004 | 10/2010 |
| EP | 2 240 352 | 10/2010 |

OTHER PUBLICATIONS

European Patent Office, International Preliminary Report on Patentability, Nov. 19, 2013, from International Patent Application No. PCT/EP2012/058757, filed on May 11, 2012.

European Patent Office, English Translation of International Preliminary Report on Patentability, Nov. 19, 2013, from International Patent Application No. PCT/EP2012/058757, filed on May 11, 2012.

* cited by examiner

PARKING BRAKE DEVICE

FIELD OF THE INVENTION

The invention relates to a parking brake device.

BACKGROUND INFORMATION

A parking brake device of this kind is discussed in DE 10 2008 007 877 B3. There, a spring brake cylinder is controlled by a relay valve which, for its part, is controlled by a bistable safety valve. The bistability is achieved by pneumatic feedback, with a select-low valve allowing the lower of two pressures applied to the outlet or to the inlet of the safety valve through to a control inlet of the safety valve. The safety valve is a 3/2-way valve having two inlets and one outlet. The first inlet can be connected selectively to a pressure medium source or atmospheric pressure by a first solenoid valve. The second inlet can likewise be connected selectively to a pressure medium source or atmospheric pressure by a second solenoid valve. The safety valve connects its outlet to one of the two inlets, depending on its operating position. The bistability of the safety valve is thus ensured, even if the power fails.

German patent document DE 10 2005 058 799 A1 discusses a parking brake device in which the spring brake cylinder is controlled by a relay valve which, for its part, can be controlled by a 3/2-way safety valve. This safety valve selectively connects its outlet to a compressed air source or atmospheric pressure. The purpose of this parking brake device is to enable the driver to activate the parking brake by actuating the service brake if the electric power supply fails.

German patent document DE 10 2007 061 908 B4 refers to a parking brake device having a spring brake cylinder, which can be selectively connected to a pressure medium source or atmospheric pressure by a relay valve. A pneumatic control inlet of the relay valve can be selectively connected to the pressure medium source or atmospheric pressure by a monostable changeover valve. The pressure medium outlet of the relay valve is connected to the pneumatic control inlet of the relay valve by a further monostable changeover valve. This provides a controllable feedback circuit for the relay valve, said circuit holding the relay valve pneumatically in a stable position in each case. It is thereby possible to avoid bistable valves for controlling the relay valve.

German patent document DE 103 36 611 A1 refers to a brake system having an electronic control device which operates electrically actuated valves upon receiving an electric actuating signal that requires deactivation of a parking brake function. In this case, use is made of a bistable valve which, in a first operating state, feeds pressure medium to an actuator and, in a second operating state, discharges pressure medium from the actuator.

Nowadays, parking brakes of commercial vehicles, including trailers, are normally fitted with spring brake cylinders which, in the release position, supply a spring compression space with compressed air and thus keep the spring under stress, while, for the parking brake function, the spring compression space is vented, i.e. connected to atmospheric pressure, with the result that the brake cylinder produces a braking force under the action of the spring (cf. Bosch, Kraftfahrttechnisches Taschenbuch (Automotive Handbook), 22nd German Edition, Düsseldorf, 1995, page 648).

In general, both purely pneumatically operated parking brakes, which are operated by driver-actuated parking brake valves that are generally bistable, and electropneumatic systems having a bistable electromechanical valve controlled by an electromechanical bistable valve are known. Both valve positions for "parking brake" and "release" must be "stable" here, i.e. must remain in the respectively selected position without human intervention. This also applies to failure of an electric power supply for the valves.

An electric or electropneumatic parking brake must therefore have two stable positions that can be maintained or automatically assumed, even if the power fails, namely
1. this state must be maintained without electric energy when the parking brake is applied;
2. the pressure to the spring-loaded cylinder and to the parking brake inlet of a trailer control valve must be maintained or supplied during a journey, at least while supply pressure is available.

An unwanted changeover between the two states must be prevented, even in the event of a fault. The only exception permitted in this respect is that the spring brake is activated if a pneumatic line is broken off. In this case, the port leading to the trailer control valve must also be vented automatically.

The changeover from the parking state to the driving state and the changeover from the driving state to the parking state is to be triggered under electric control. It is furthermore desirable that it should be possible to set any pressure between zero and the supply pressure in the driving state.

SUMMARY OF THE INVENTION

It is therefore an object of the invention to provide a parking brake device which reliably satisfies the above requirements.

This object may be achieved by the features indicated and described herein. Advantageous embodiments and developments of the invention can be found in the further description herein.

The present invention includes providing a parking brake valve having a piston that has two coaxial piston faces. This can be a stepped piston or a piston with two piston faces situated in series. In the normal position thereof, the piston is pressed against a first stop by a spring or by the supply pressure or by both, wherein a first space is closed off from a pressure port and connected to ambient pressure in this position by the first piston face. A second space above the second piston face is continuously connected to a second port, to which either supply pressure or atmospheric pressure is fed. Both piston faces are large enough to move the piston against the opposite stop, counter to the spring force, above a certain pressure in the respective first or second space. This pressure is lower and, in particular, significantly lower than the supply pressure. In this stop position of the piston, into which it has been moved counter to the force of the spring, the first space is supplied with supply pressure or with a set pressure and is shut off from atmospheric pressure. A third port of the parking brake valve, as an outlet, connects the first space by the first piston face to devices that are to be controlled.

In a first illustrative embodiment of the invention, the device to be controlled is a relay valve, the pneumatic control inlet of which is connected to the third port of the parking brake valve.

The first port of the parking brake valve can be supplied either with ambient pressure, with supply pressure or with a pressure in between by an electrically actuated valve arrangement consisting of two 2/2-way valves or one 3/2-way valve. In the deenergized state, this electrically actuated valve arrangement connects to supply pressure. The second port of the parking brake valve can be supplied either with ambient pressure or with supply pressure by a changeover valve, e.g.

by a 3/2-way solenoid valve. In the deenergized state, this changeover valve switches to ambient pressure.

The parking brake valve with the piston is thus bistable and does not change its previously assumed state if the power supply for the electrically actuated valves fails.

With the illustrative embodiment of the invention described thus far, it is possible to implement the following five functions:

Function 1: Stable Parking State

All the electric valves or valve devices are deenergized. These valve devices or valves are solenoid valves, for example. However, they can also be valves actuated electrically in some other way, e.g. piezoelectrically actuated or motor-actuated valves. Supply pressure is applied to the first port of the parking brake valve, while ambient pressure is applied to the second port and in the second space. The piston is in the normal position. The supply pressure applied to the first port is shut off. The first space and hence also the third port are connected to ambient pressure. Any leaks would be vented via this connection to ambient pressure.

Function 2: Stable Driving State

The piston is in an actuated position, i.e. has been moved counter to the force of the spring. The first space and hence also the third port are connected to supply pressure via the first port and the deenergized valve arrangement. Any leaks would be made up for by the supply pressure. If there is a port for a trailer control module, this port is connected to the first port. If there is a trailer test valve having a port for a second trailer control valve, the control piston thereof is connected by a shuttle valve to the higher of the two pressures, that is to say to the pressure at the first port in this position. Any losses due to leaks are compensated by a supplementary flow through the electric valves.

Function 3: Electric Changeover from the Parking State to the Driving State

The changeover valve is energized. Air is admitted to the second space via the second port. The piston is moved into its lower position counter to the force of the spring. The first space is isolated from ambient pressure and connected to the first port, to which supply pressure is applied. The first piston face in the first space is sufficient to hold the piston in this position. The changeover valve can then be switched off again. The stable driving state is established.

Function 4: Electric Setting of Any Desired Pressure

The intention is to set any pressure between zero and the supply pressure. The changeover valve is energized. The pressure in the second space thus holds the piston in a stable manner against the lower stop, counter to the force of the spring. By the other valves, which act as inlet and outlet valves, any desired pressure between ambient pressure and supply pressure can be set in the first space and hence also at the third port. If the power fails, the second space is admittedly vented, but air is admitted to the first space. The piston therefore remains in its depressed position. It must merely be ensured that the flow cross sections of the electric valves and the piston faces of the piston are chosen in such a way that the sum of the pressures in the first and second spaces is always sufficient to hold the piston reliably against the lower stop, counter to the force of the spring.

Function 5: Electric Changeover from the Driving State to the Parking State

The starting situation is the stable driving state (function 2). By the electric valves, the pressure at the first port and hence also in the first space and at the third port is relieved. The spring pushes the piston against its upper stop. Thus, the first space is isolated from the first port and connected to ambient pressure. The electric valves can be switched off. The stable parking state has been achieved.

The parking brake valve of the type described above can also be equipped with one or more trailer control ports for pneumatic control of a trailer control module or trailer control valve.

In a first variant, there is a trailer control port of a first type (ASM1), which is connected to the first port of the parking brake valve. In the case of functions 1, 2 and 3, the trailer control port is thus supplied with supply pressure, and the trailer is thus unbraked. In the case of function 4, the port leading to the trailer control port has the same pressure as the relay valve. The trailer therefore brakes as strongly as the spring brakes. In the case of function 5, the trailer control port is briefly depressurized during the changeover operation. After this, it is again supplied with air. Thus, the trailer briefly brakes along with the spring brakes and is then unbraked in the stable parking position.

In another variant of the trailer control system, a trailer control port of a second type (ASM2) is provided, this being controlled by a trailer test valve. The same pressure is to be applied as the spring brake in the stable driving position (function 2) during stepped pressure regulation (function 4), during the changeover to the stable driving position (function 3) and in the stable parking position (function 1). Since supply pressure is always applied at least to one of the first or second ports of the parking brake valve in all of these functions, the higher of these two pressures is directed to the control port of a trailer test valve by a shuttle valve. This then connects the third port of the parking brake valve to the trailer control port. In the case of function 5, the trailer control port is briefly unpressurized. As a result, it briefly switches supply pressure to the trailer control port. Thus, the brakes of the trailer are briefly released, this corresponding to the behavior in the case of function 6, which is described below.

In this second variant of the trailer control system, the law prescribes that drivers must be able to deactivate the trailer brakes at any time in order to determine whether the tractor-trailer combination is being held only by the spring-loaded cylinders of the tractor vehicle. The driver should test this each time when the parking brake is applied. This gives rise to the requirement for an additional sixth function.

Function 6: Test Function

The trailer brakes are released by venting the trailer control port of the second type. The electric valves are switched after venting. As a result, both ports of the shuttle valve are unpressurized. The third space is vented. A spring of the trailer test valve pushes the control member thereof back, and the port leading to the second trailer control module is connected to supply pressure.

The trailer test valve can be a pneumatically controlled 3/2-way valve, which connects the trailer control port of the second type to supply pressure when the control port is unpressurized, and connects it to the pressure of the third port of the parking brake valve or to the pressure of the relay valve when the control port is pressurized. The trailer test valve can be configured as a slide valve or as a double seat valve.

In a third variant of the trailer control system, trailer control ports of the first and second types are present. It is thereby possible to use either one of the two types of trailer control system with a single type of parking brake valve device on different vehicles.

The invention provides two variants for the electric valves. A first variant has two valves, one of which is an air admission valve and the other is a vent valve.

According to one alternative, it can be a 3/2-way valve, by which pressure regulation is likewise possible. Here, this valve is connected in rapid succession to ambient pressure for a first period of time and then to supply pressure for a second period of time. After a brief period, an intermediate pressure is established, the level of which is dependent on the ratio of the first to the second period of time. The ratio of the periods of time can be controlled as a function of a target pressure by a characteristic map or can be regulated by a pressure sensor in a closed control circuit.

For more accurate and/or more rapid adjustment of the pressure in the abovementioned function 4 and in order to achieve an improvement in the monitoring of this function, further pressure sensors or pressure switches can be provided at the first and/or at the third port of the parking brake valve and/or at the outlet of the relay valve.

According to a development of the invention, an anti-compound function can also be provided, preventing the wheel brakes from being overloaded by superimposition of the application forces of the service brake and the parking brake. If the service brake is actuated simultaneously with the parking brake, the action of the spring brake is reduced to the same extent as the service brake is applied by venting the spring brake through the action of the anti-compound function. The anti-compound function can be implemented by a shuttle valve connected to the control chamber of the relay valve, by a second relay piston or by a shuttle valve downstream of the relay valve outlet.

According to a development of the invention, the compressed air to the trailer control port of the second type can be controlled according to two different variants. In the first variant, the air, which in normal circumstances, i.e. outside the test function, is directed to the second trailer control module, will come directly from the third port of the parking brake valve. Hence, the pressure to the trailer control port of the second type is precisely and steadily the same as the pressure to the trailer control port of the first type in the case of function 4. Moreover, the pressure to the trailer control port of the second type is always independent of any modifications by an anti-compound function.

In the second variant, the air, which in normal circumstances, i.e. outside the test function, is directed to the trailer control port of the second type, is picked off only after the relay valve. As a result, the control volume into which the electric valve device must regulate pressure is independent of the volume of the trailer control module. Moreover, leaks after the trailer control port of the second type are automatically compensated by the relay valve.

The present invention is explained in greater detail below by illustrative embodiments in conjunction with the drawings.

DETAILED DESCRIPTION

Figure 1:
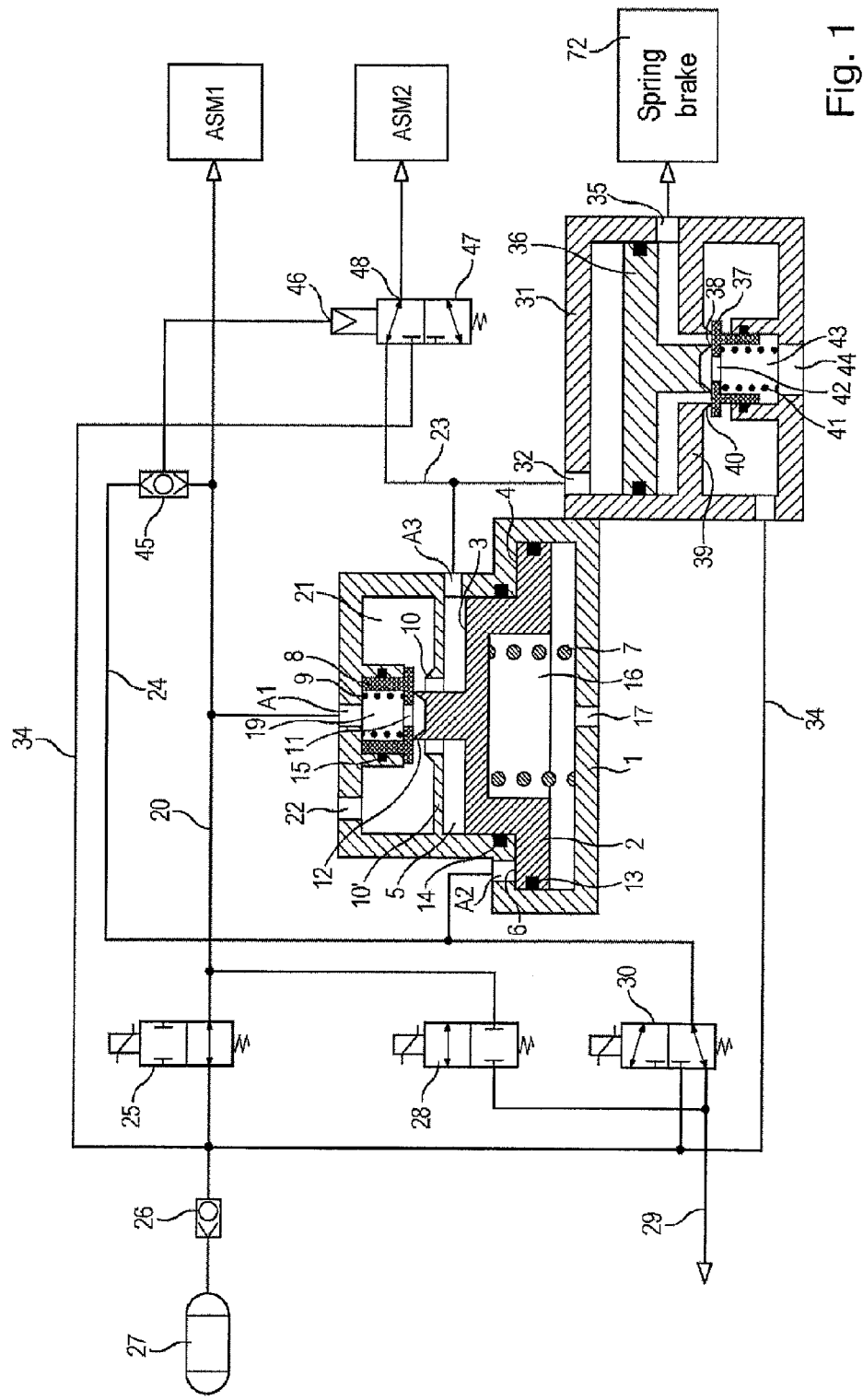
FIG. 1 shows the parking brake device in a stable parking position.

In the first illustrative embodiment in FIGS. 1 to 5, a parking brake valve 1 having a piston 2 is shown, said piston being configured as a stepped piston which has a first piston face 3 and a second piston face 4. The first piston face 3 delimits a first space 5, and the second piston face 4 delimits a second space 6. The two piston faces 3 and 4 are coaxial with one another and are each of a size sufficient to move the piston 2 against a stop counter to a spring force above a predetermined pressure, this predetermined pressure being lower than the supply pressure. The piston 2 is loaded by a spring 7, which pushes the piston 2 in a direction in which the two piston faces 3 and 4 reduce the size of the two spaces 5 and 6.

The parking brake valve 1 has a second movable piston 8, which is preloaded by a second spring 9 in the direction of the piston 2 and in the direction of a first valve seat 10. An opening 11 facing the first space 5 is provided in the bottom of the second piston 8.

The piston 2 bears a second valve seat 12, which interacts with the second piston 8. The piston 2 and the second piston 8 are each guided movably against housing walls of the parking brake valve 1 by seals 13, 14, 15. The piston 2 has a first spring space 16, in which the spring 7 is arranged. This spring space 16 is vented to the atmosphere via a housing opening 17. The second piston 8 has a second spring space 19, in which the spring 9 is arranged, wherein the second spring space 19 has a first port A1, to which a control pressure line 20 is connected.

When the second piston 8 is extended, the first valve seat 10 isolates the first space 5 from a venting chamber 21, which surrounds the second piston 8 and is vented to atmosphere via a housing opening 22.

The first space 5 has a third port A3, which forms the outlet of the parking brake valve 1 and to which a line 23 is connected. The second space 6 has a second port A2, to which a control pressure line 20 is connected.

The control pressure line 20 is connected to supply pressure, e.g. to a supply pressure reservoir 27, by a first valve 25 and a check valve 26. The first valve 25 can be, for example, a 2/2-way valve which is open in the deenergized state and shut off in the energized state. The outlet of the first valve 25 is furthermore connected to a second valve 28, which can likewise be a 2/2-way valve. In the deenergized state, the second valve 28 is in the shutoff position and, in the energized state, it connects the control pressure line 20 to a vent line 29. The first valve 25 therefore acts as an inlet valve and the second valve 28 acts as an outlet valve. The two together form a first valve arrangement.

The first line 24, which leads to the second space 6, is connected to a third valve 30, which serves as a changeover valve and is, for example, a 3/2-way valve. In the energized state, the third valve 30 connects the first line 24 to supply pressure from the check valve 26 and therefore supplies the second port A2 and hence the second space 6 of the parking brake valve 1 with supply pressure whereas, in the deenergized state, it supplies them with ambient pressure.

In the deenergized state, the first valve 25 connects the supply pressure to the control pressure line 20 and therefore supplies the first port A1 and hence the second piston 8 with supply pressure, said piston likewise supplying the first space 5 with supply pressure via the opening 11 and the opened valve seat 12.

The first space 5 is connected via the third port A3 and the first line 23 to a relay valve 31, more specifically to the pneumatic control inlet 32 thereof. A pressure medium inlet 33 of the relay valve 31 is connected via a line 34 to supply pressure, more specifically to the outlet of the check valve 26. A pressure outlet 35 of the relay valve 31 is connected to one or more spring brake cylinders 72.

The relay valve 31 has two movable pistons 36 and 37, which together form a valve seat 38. With a housing partition wall 39, the second piston 37 furthermore forms a second valve seat 40. The second piston 37 is preloaded in the direction of the first piston 36 by a spring 41 and, in the piston bottom thereof, has an opening 42 leading to a spring space 43, which is vented to the atmosphere via an opening 44 in the housing of the relay valve 31.

The lines 20 and 24 are connected to inlets of a shuttle valve 45, the outlet of which is connected to a control inlet 46 of a trailer test valve 47. The shuttle valve 45 is a "select-high" valve, which connects the higher pressure at the inlets thereof through to the outlet.

The control pressure line 20 furthermore leads to a first trailer control port ASM1, while an outlet 48 of the trailer test valve 47 leads to a second trailer control port ASM2.

The trailer test valve 47 is a pneumatically controlled changeover valve, the control inlet 46 of which is connected to the outlet of the shuttle valve 45. The two pressure inlets thereof are connected to the third port A3 of the parking brake valve 1 and to the supply line 34. The outlet 48 thereof is connected to the second trailer control port ASM2. In the illustrative embodiment in FIG. 2, it has four mutually sealed spaces 49, 50, 51 and 52 with a spool 53 loaded by a spring 54.

The outlet of the shuttle valve 45, which leads to the control inlet 46 of the test valve 47, is connected to the first space 49 (FIGS. 2-5). The spring 54 pushes the spool 53 in the direction of the first space 49. The second space 50 of the trailer test valve 47 is connected to the line 23, which is connected to the first space 5 of the parking brake valve 1. Depending on the position of the spool 53, the third space 51 of the trailer test valve 47 is connected to the second space 50 or sealed off therefrom. The second space 51 is connected to the outlet 48 of the trailer test valve 47, which leads to the second trailer control port ASM2.

The fourth space 52 of the trailer test valve 47 is connected to the line 34 and thus supplied continuously with supply pressure. Depending on the position of the spool 53, the fourth space 52 is connected to the third space 51 or isolated therefrom. In the connecting position of the spool 53, supply pressure thus passes from the line 54 to the outlet 48 of the trailer test valve 47.

The mode of operation will be explained below in conjunction with FIGS. 1 to 5.

FIG. 1 shows the stable parking state. The three valves 25, 28 and 30 are deenergized. The first valve 25 directs supply pressure via the control pressure line 20 to the port A1 of the parking brake valve 1. The second valve 28 is shut off. The third valve 30 provides venting for the port A2 of the second space 6. The piston 2 is pushed by the spring 7 into a limit position, in which the valve seat 12 is closed and the valve seat 10 is open. The first space 5 is thus vented via the venting chamber 21 and the housing opening 22, and the port A3 and hence the control inlet 22 of the relay valve 21 are thus vented, with the result that the piston 37 of the relay valve 31 closes the valve seat 40 owing to the spring 41. A residual pressure of the spring brake cylinder moves the piston 36 of the relay valve, with the result that the valve seat 38 opens and pressure can flow from the spring brake cylinders via the opening 42 in the piston 38 and the spring space 43 via the opening 44. The spring brake cylinders are vented and the stable parking situation is ensured.

Figure 2:
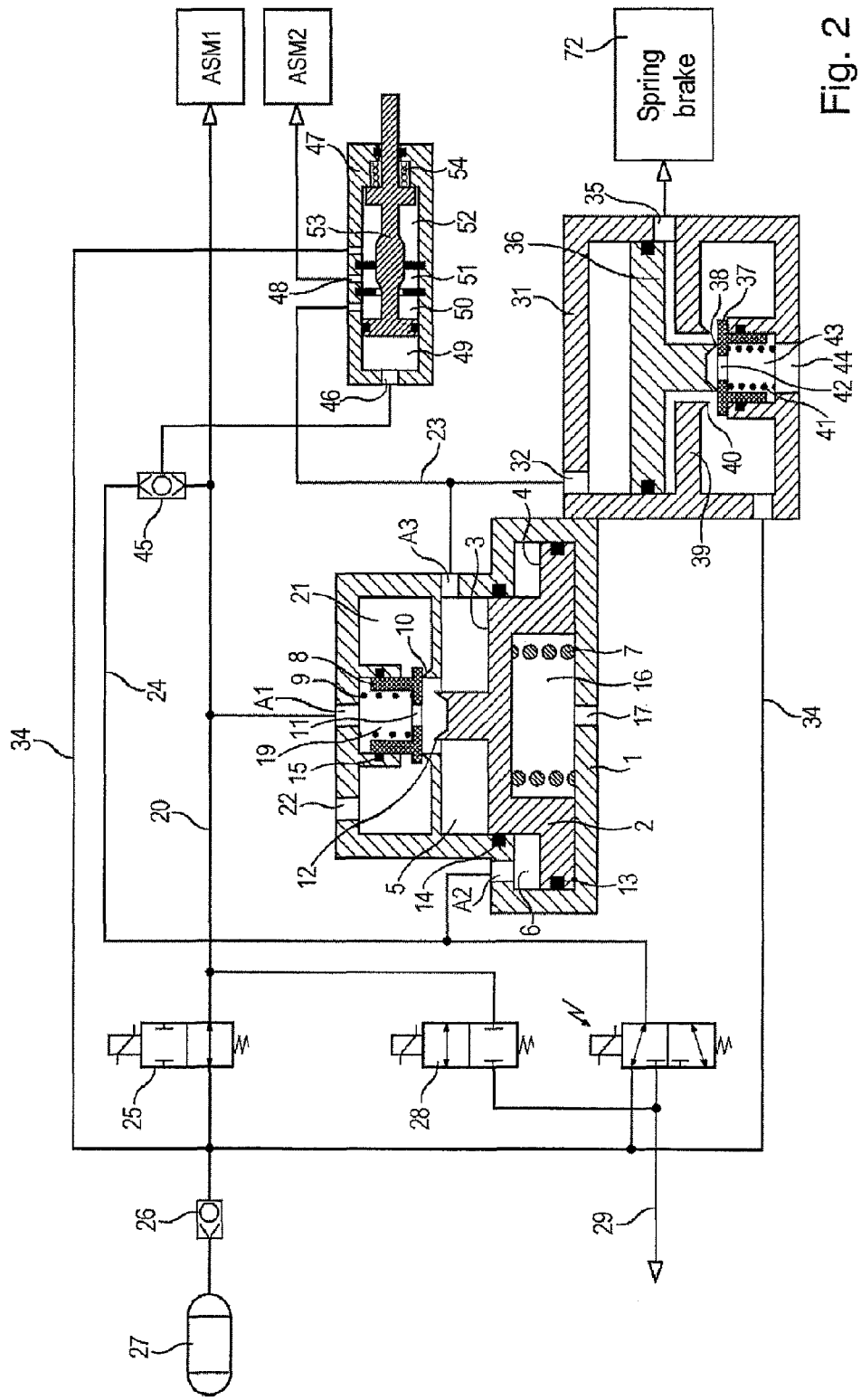
FIG. 2 shows the parking brake device during the changeover to the driving position.

FIG. 2 shows the state of the switching over to a driving position, in which the spring brake cylinders 72 can be supplied with pressure. The first and second valves 25 and 28 are deenergized, while the changeover valve 30 is energized. Supply pressure thus passes from the line 34, via the changeover valve 30, to the second port A2, and the second space 6 is supplied with supply pressure, as a result of which the piston 2 is pushed into a lower limit position counter to the force of the spring 7. Supply pressure is furthermore applied to the first port A1 of the parking brake valve 1, as a result of which the first valve seat 10 is closed. The second valve seat 12 is opened by the depressed piston 2, with the result that supply pressure passes via the control pressure line 20, the port A1, the opening 11 in the second piston 8 and the opened valve seat 12 into the first space 5 and hence to the port A3. The piston 36 of the relay valve 31 is pressed against the piston 37, thereby opening the valve seat 40 and closing the valve seat 38. As a result, supply pressure passes from the line 34 to the pressure medium outlet 35 of the relay valve 31 and releases the spring brake cylinder.

Figure 3:
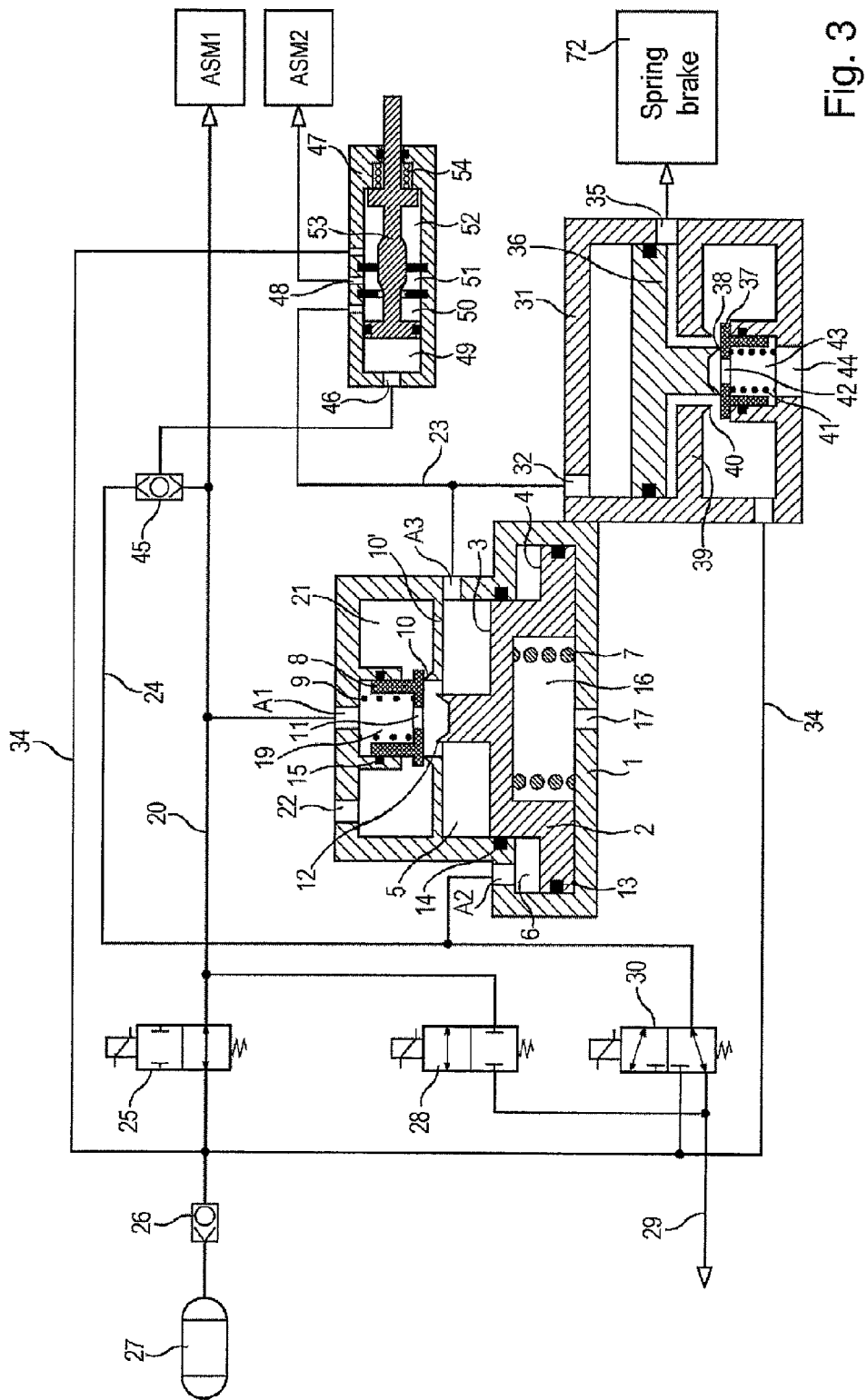
FIG. 3 shows the parking brake device in the stable driving position.

FIG. 3 shows the state of the stable driving position after the changeover operation in FIG. 2. The three valves 25, 28 and 30 are deenergized. The first space 5 is supplied with supply pressure, as a result of which the piston 2 remains in the position pressed against the stop, counter to the force of the spring 7. The second space 6 is vented, but the pressure in the first space 5 is sufficient to keep the piston 2 depressed. The pressure applied to the port A3 is thus supply pressure, which pushes the piston 36 of the relay valve 37 against the piston 37, as a result of which the valve seat 40 remains open and supply pressure passes to the outlet 35 of the relay valve 31 and hence to the spring brake cylinders. The spring brake is thus released. The control inlet 46 of the trailer test valve 47 is supplied with supply pressure by the shuttle valve 45. The supply pressure from the port A3 thus passes from the chamber 50 into the chamber 51 and hence to the second trailer control port ASM2. The first trailer control port ASM1 is supplied directly with supply pressure via the first valve 25.

Figure 4:
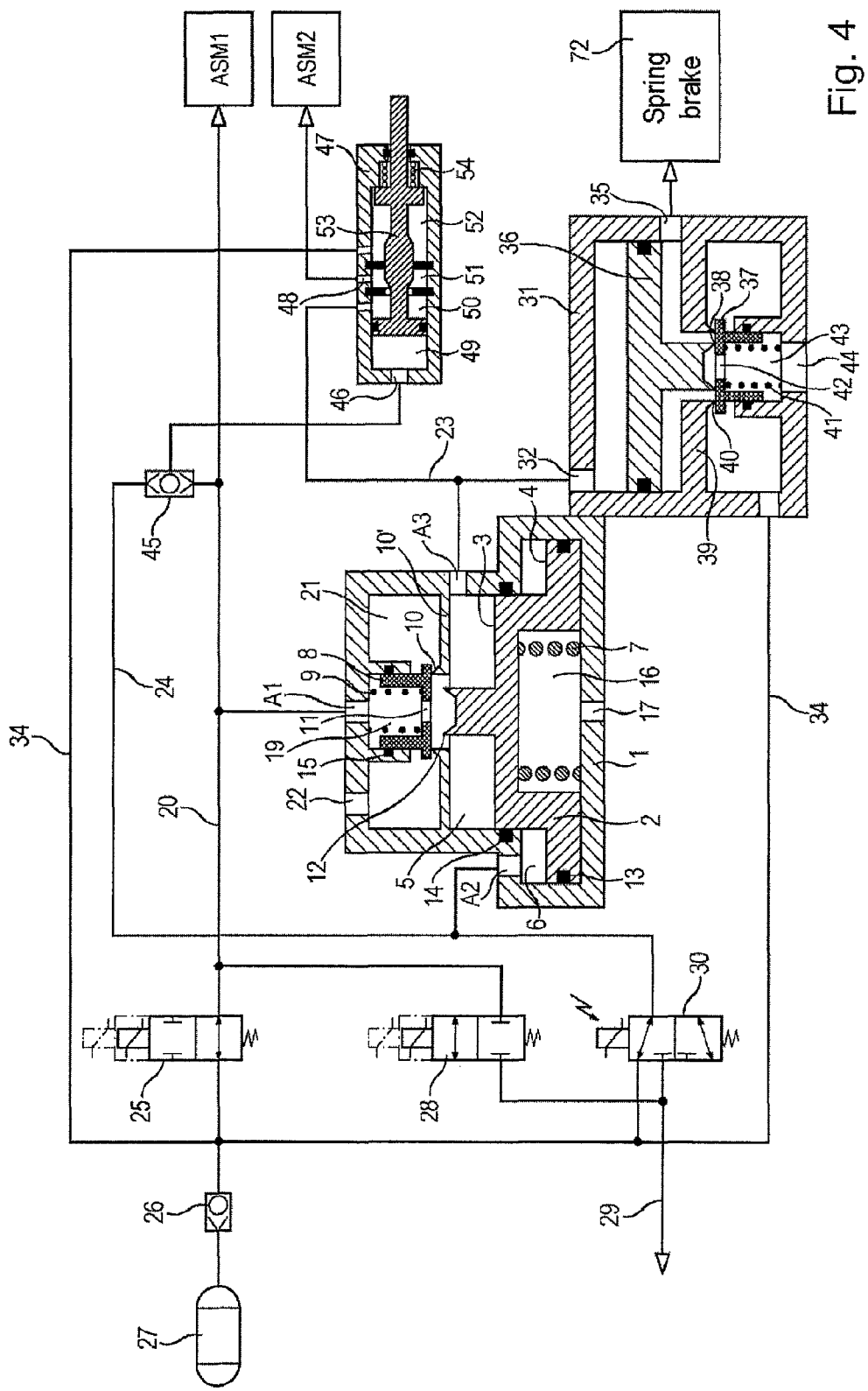
FIG. 4 shows the parking brake device during pressure regulation.

FIG. 4 shows the state of the electric setting of any desired pressure between zero and supply pressure in the driving state. The changeover valve 30 is energized. Supply pressure is applied to the second port A2, holding the piston 2 in a stable manner in the lower limit position, counter to the force of the spring 7. By the two valves 25 and 28, any desired pressure between ambient pressure and supply pressure can then be set in the first space 5 and hence at the third port A3.

If the power fails, the second space 6 is vented but air is admitted to the first space 5, with the result that the set pressure is maintained at the two trailer control ports ASM1 and ASM2 and the spring brake cylinders 72. It must merely be ensured that the sum of the pressures in the first and second spaces 5 and 6 is always sufficient to hold the piston 2 reliably against the lower stop, counter to the spring 7.

Figure 5:
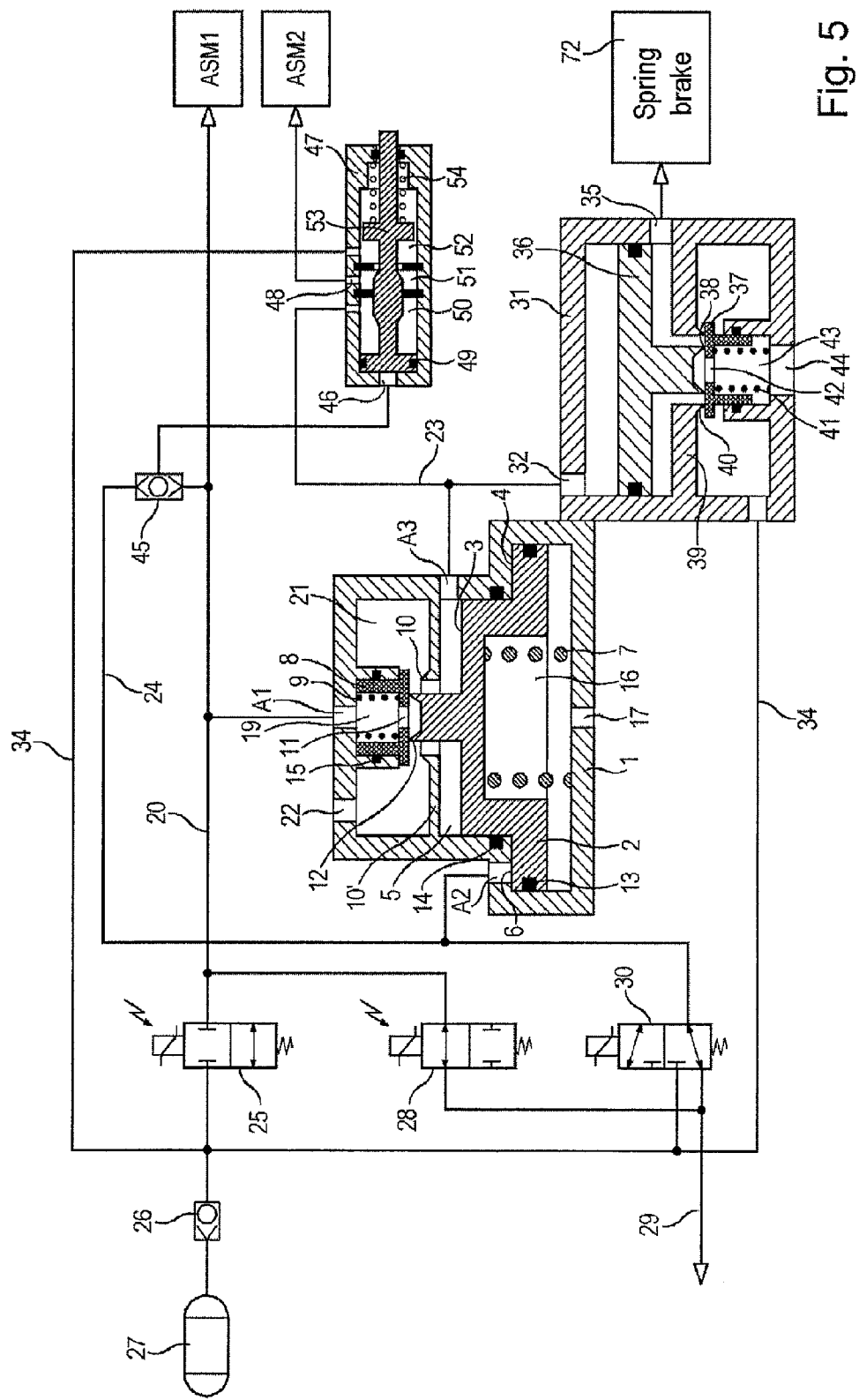
FIG. 5 shows the parking brake device during the changeover to the parking position and during the trailer test.

FIG. 5 shows the state of the changeover to the parking position. The first and second valves 25 and 28 are energized. The changeover valve 30 is deenergized. The first space 5 and the second space 6 are vented. The spring 7 pushes the piston 2 upward against the piston 8, closes the valve seat 12 and opens the valve seat 10. The first space 5 is vented via the vent opening 22. The port A3 is unpressurized, and the relay valve 31 can vent the spring brake cylinders 72 via the opened valve seat 38 and the openings 42 and 44 with valve seat 40 closed.

The control inlet 46 of the trailer test valve 47 is unpressurized, and the spool 53 is moved against an end stop by the spring 54, with the result that the chambers 51 and 52 are interconnected, and the second trailer control port ASM2 is supplied with supply pressure via the trailer test valve 47. All the electrically actuated valves 25, 28 and 30 can be switched off, and a stable parking state has been achieved.

Figure 6:
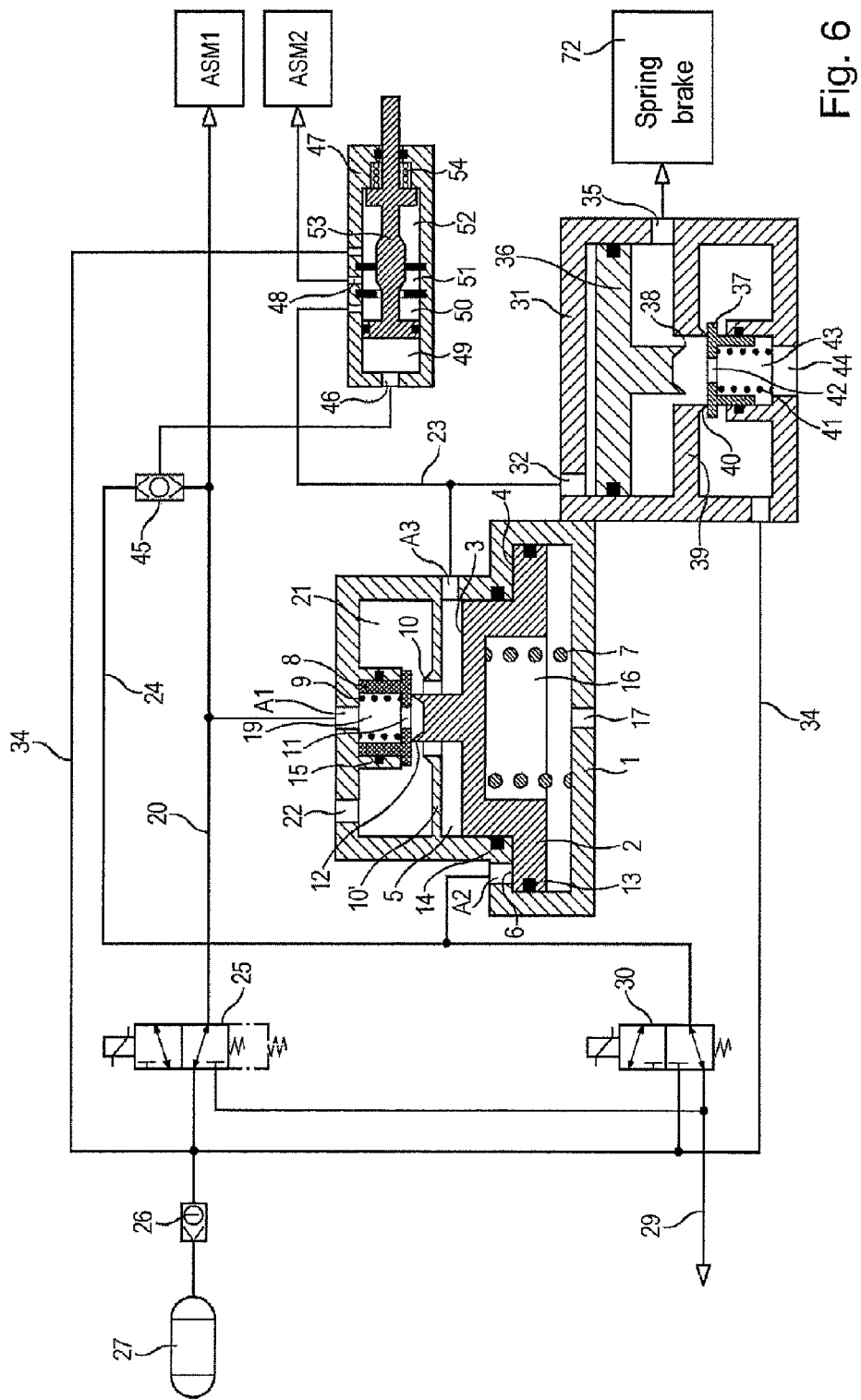
FIG. 6 shows the parking brake device with a 3/2-way valve for setting the pressure.

FIG. 6 shows a variant of the invention in which the first valve 25 is a changeover valve, e.g. a 3/2-way solenoid valve. The parking brake valve 1 and the relay valve 31 are each in the driving position, i.e. the spring brake 72 is supplied with pressure and hence released. The two trailer control ports ASM1 and ASM2 are supplied with working pressure, which can be regulated electrically by the first valve 25.

Figure 7:
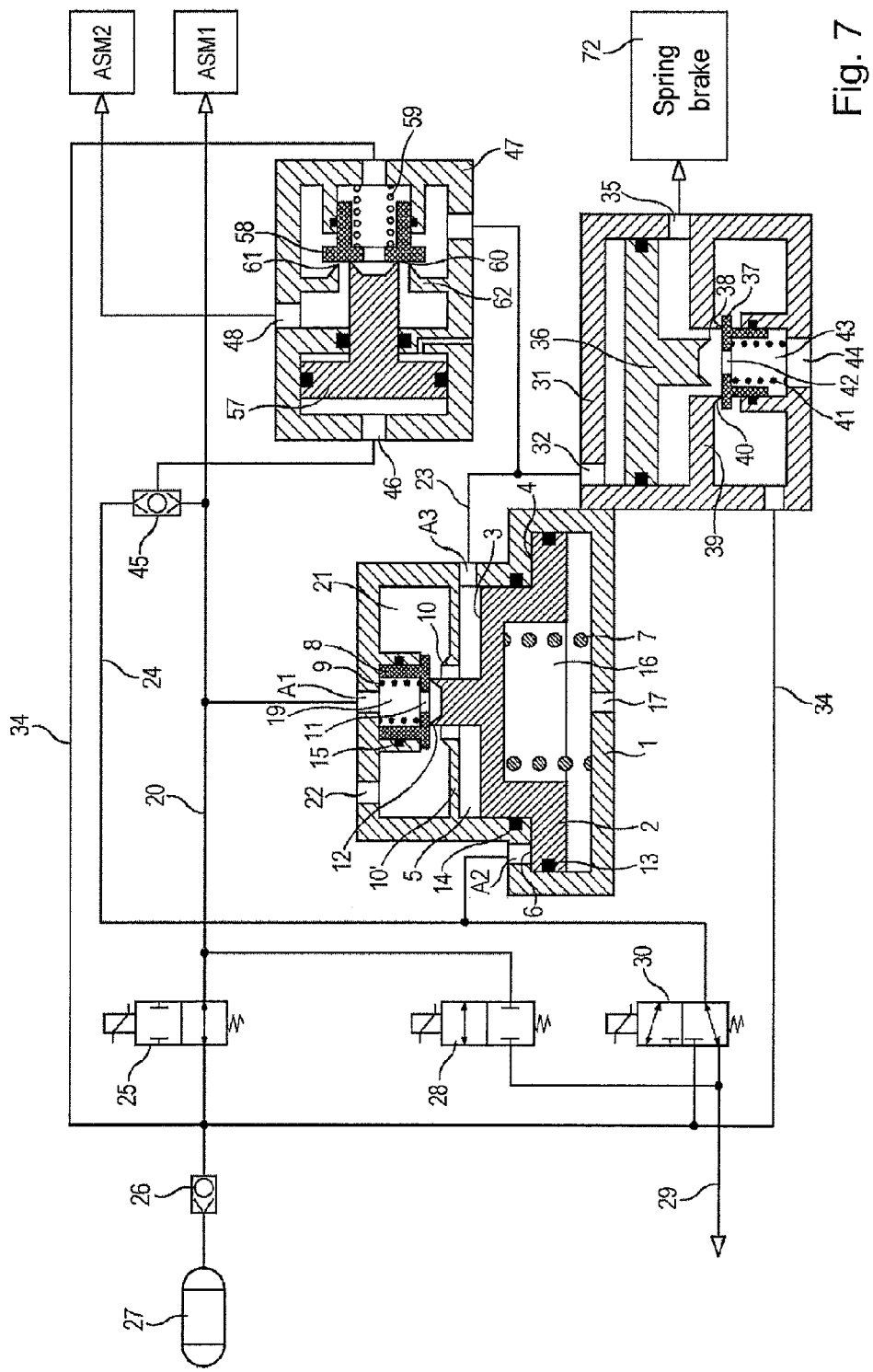
FIG. 7 shows the parking brake device with a trailer test valve in the form of a double seat valve.

FIG. 7 shows a variant of the invention in which the trailer test valve 47 is configured as a double seat valve and, like the relay valve 31, has two movable pistons 57 and 58, of which the piston 58 is preloaded by a spring 59. A first valve seat 60 is formed between the two pistons 57 and 58, and a second valve seat 61 is formed between the second piston 58 and a housing wall 62. If compressed air is applied to the control port 46, the valve seat 60 is closed and the valve seat 61 is opened. Pressure medium from the port A3 then passes to the outlet 48 and hence to the trailer control port ASM2.

Figure 8:
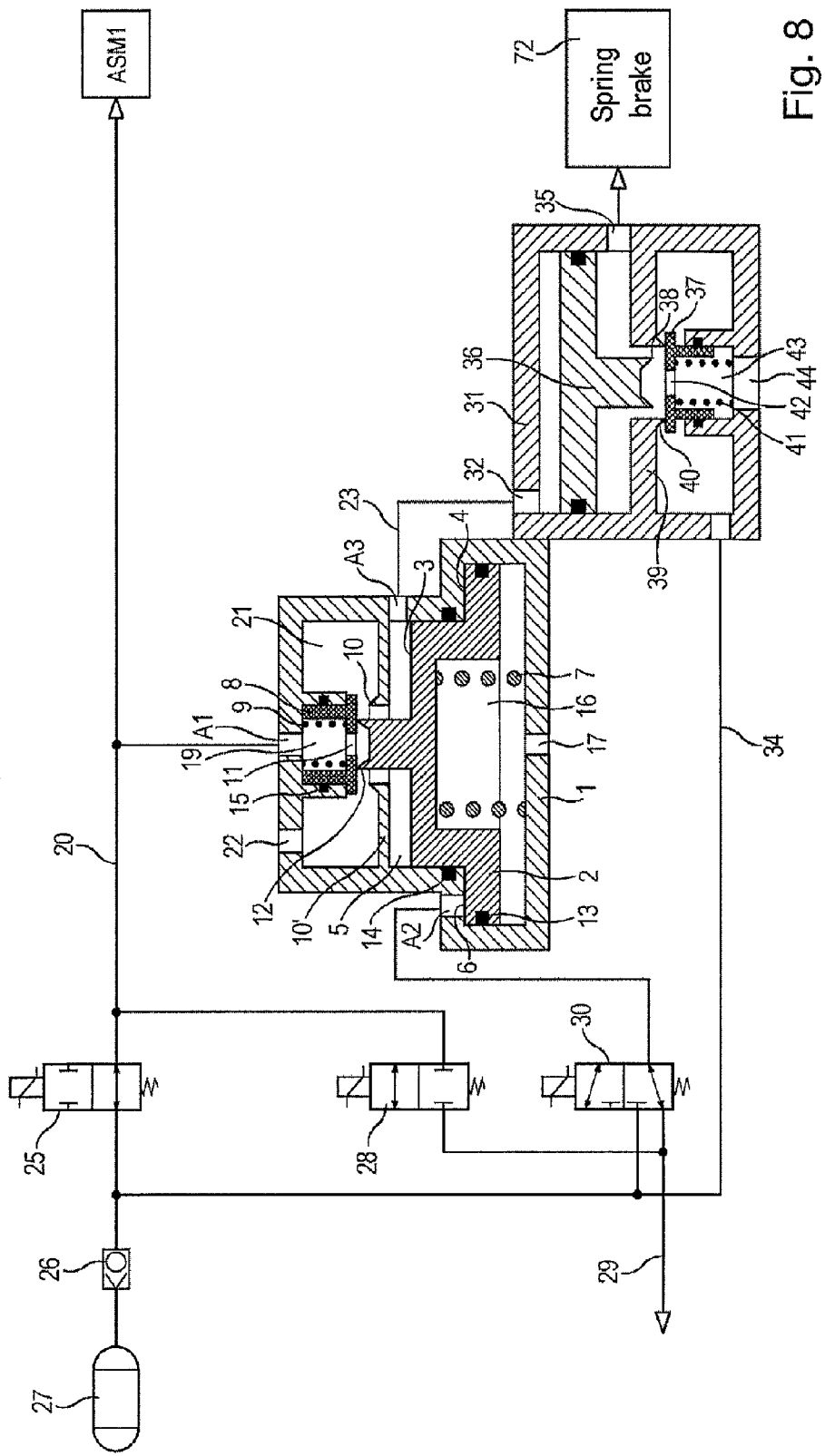
FIG. 8 shows the parking brake device with just one trailer control port of the first type.

In the variant in FIG. 8, the second trailer control port ASM2 is omitted. In the stable parking position, air is admitted to the trailer control module ASM1 and the spring brake 72 is vented. The other positions are adopted in a manner similar to the illustrative embodiment in FIGS. 1 to 5.

Figure 9:
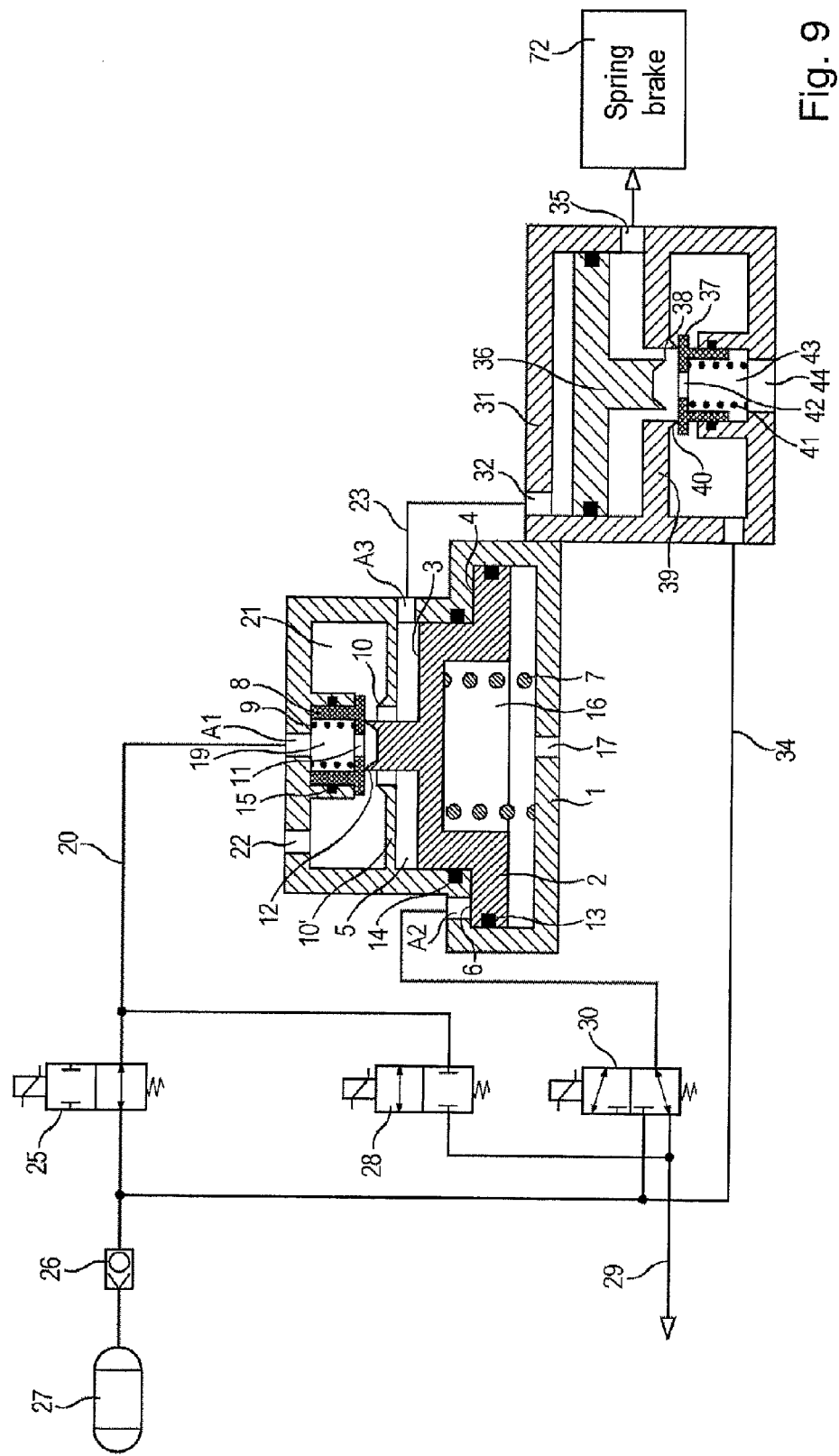
FIG. 9 shows the parking brake device without a trailer control port.

FIG. 9 shows a variant without a trailer. The two trailer control ports ASM1 and ASM2 are omitted, as is the trailer test valve. Outlet A3 of the parking brake valve 1 is thus connected only to the relay valve 31.

Figure 10:
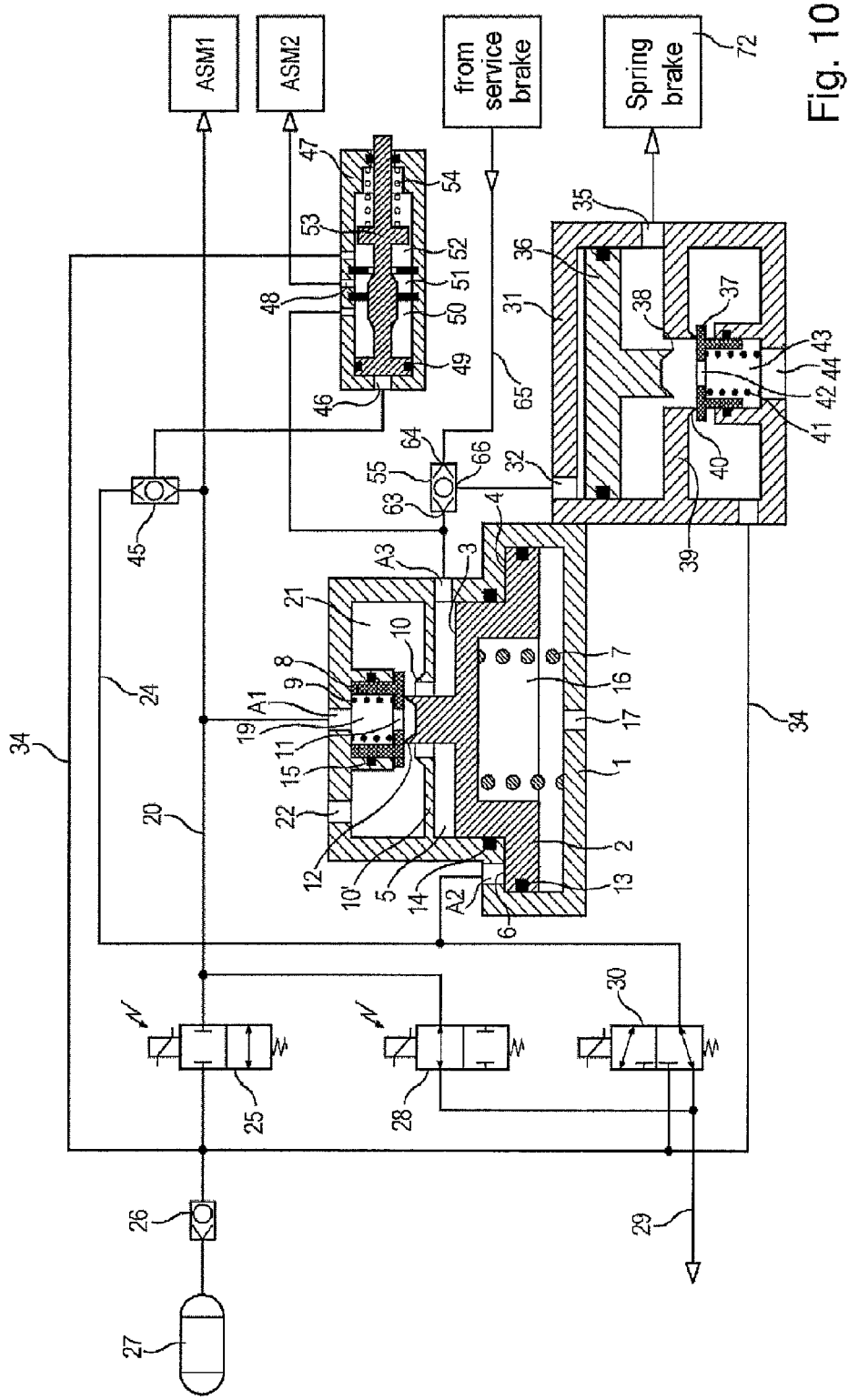
FIG. 10 shows the parking brake device with a first variant of an anti-compound function.
Figure 11:
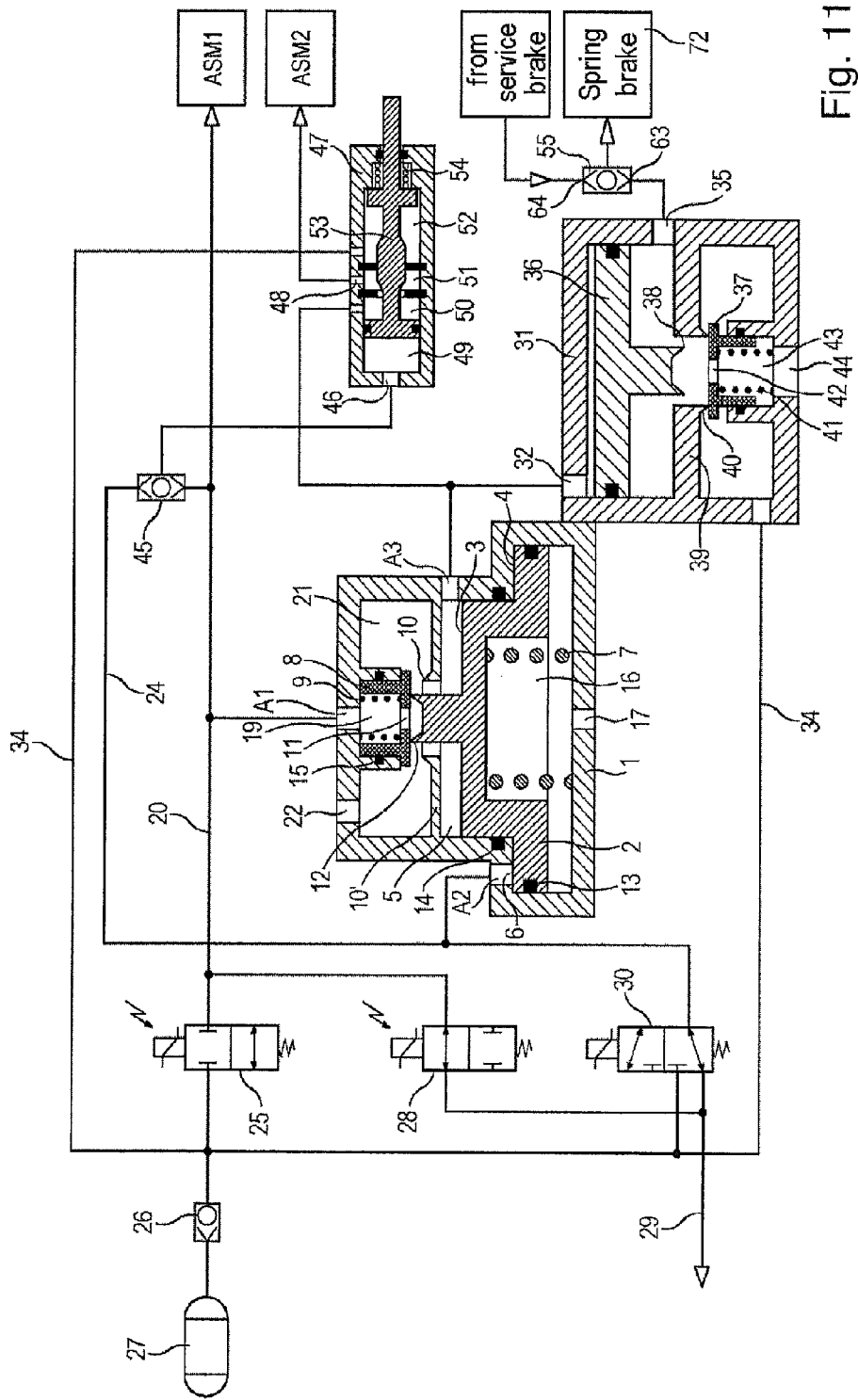
FIG. 11 shows the parking brake device with a second variant of an anti-compound function.

The variants in FIGS. 10 and 11 also have what is known as an anti-compound function, which prevents the wheel brakes from being overloaded by superimposition of the application forces of the service brake and the parking brake (spring brake). If the service brake is actuated simultaneously with the parking brake, the action of the spring brake is reduced to the same extent by air admission.

For this purpose, a second changeover valve 55, the first inlet 63 of which is connected to the outlet A3 and the second inlet 64 of which is connected to a pressure line 65 of the service brake and the outlet 65 of which is connected to the pneumatic control inlet 32 of the relay valve 31, is inserted between the port A3 of the parking brake valve 1 and the pneumatic control inlet 32 of the relay valve 31. If pressure is applied to the service brake in the stable parking position, the valve seat 38 closes and the valve seat 40 opens, with the result that the spring brake is supplied with service brake pressure and thus compensates the application force of the service brake.

In the variant in FIG. 11, the changeover valve 55 is connected by its first inlet 63 to the pressure medium outlet 35 of the relay valve and by its second inlet 64 to a pressure medium line of the service brake. By this means too, the desired anti-compound function is achieved. In both variants, the changeover valve 55 is a "select-high" valve.

Figure 12:
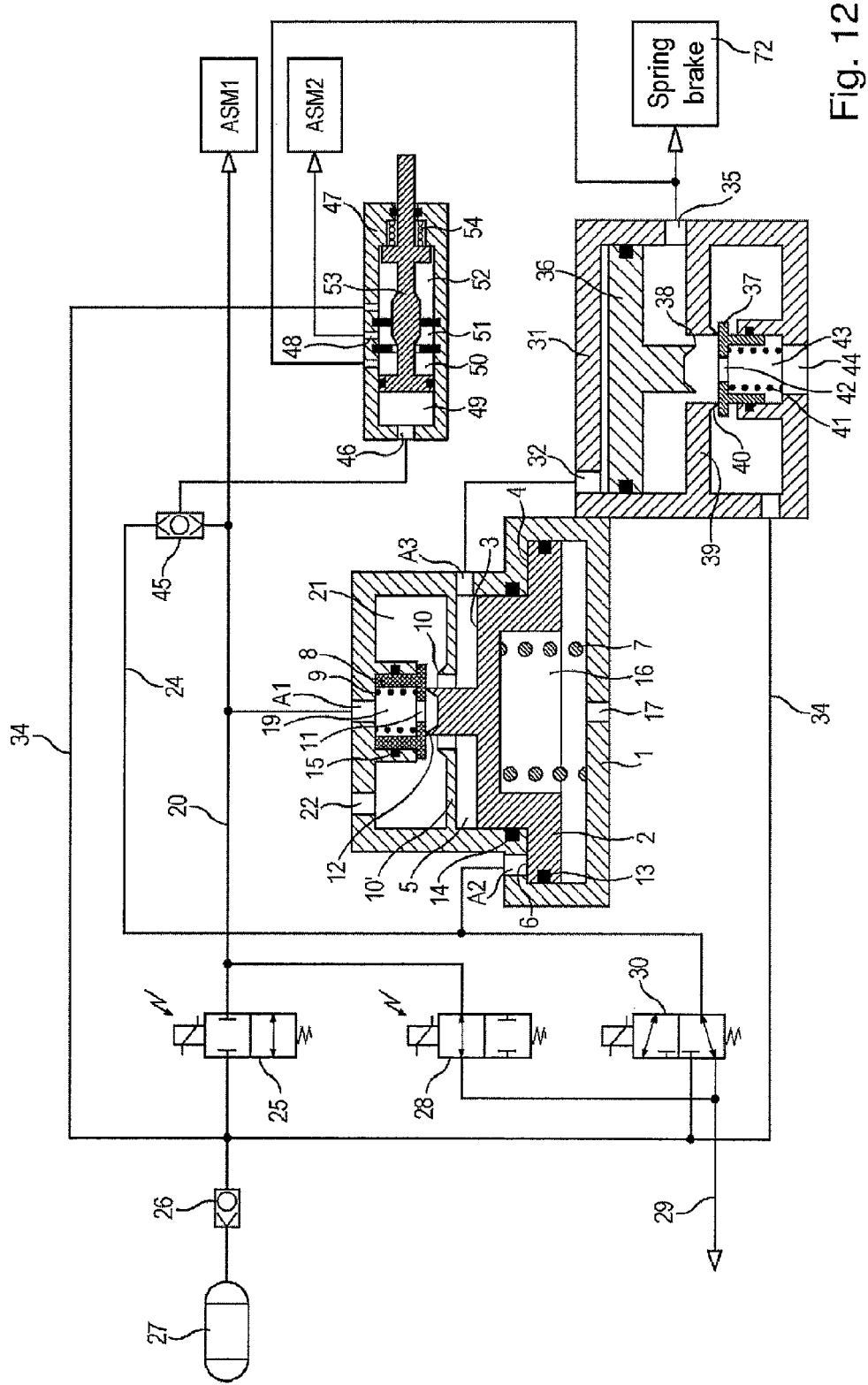
FIG. 12 shows a variant of the parking brake device, in which air is delivered to the trailer control port of the second type by the relay valve.

FIG. 12 shows a variant of the invention in which the trailer test valve 47 receives supply air from the pressure medium outlet 35 of the relay valve 31. As a result, the same pressure is fed to the trailer control port ASM2 as to the spring brake 72. The anti-compound function variant with the changeover valve at the control port 32 of the relay valve is not provided in this variant.

Figure 13:
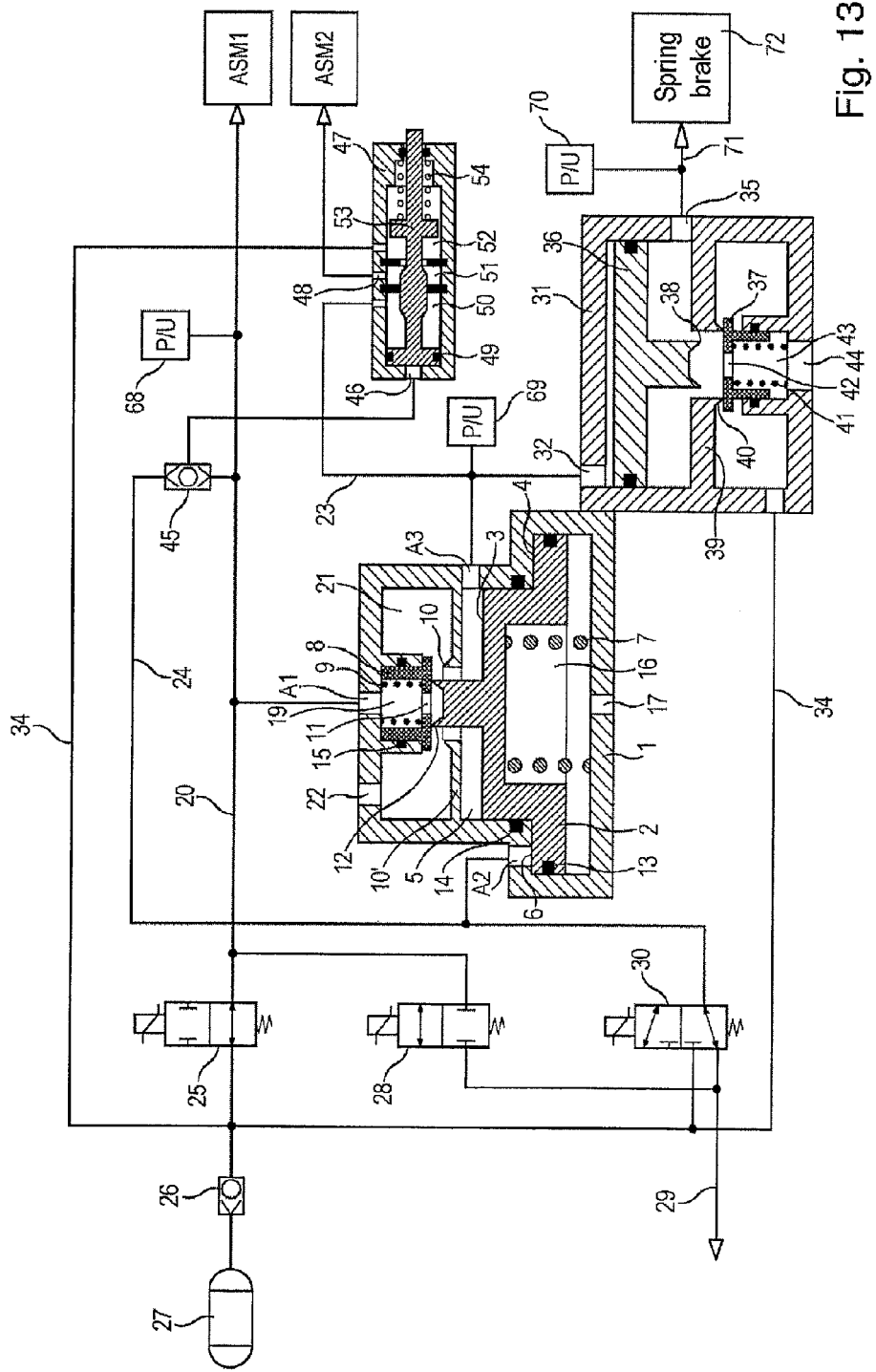
FIG. 13 shows a variant of the parking brake device with pressure/voltage transducers for measuring various pressures.

FIG. 13 shows a variant having pressure sensors 68, 69 and 70 on the lines 20, 23 and the line 71, which is connected to the pressure medium outlet 35 of the relay valve 31 and leads to the spring brake.

By the pressure sensors, which are pressure/voltage transducers, the pressure values can be measured and evaluated in an electronic control unit, wherein the electronic control unit can control the electric valves 25, 28 and 30 in order to set desired pressures.

Figure 14:
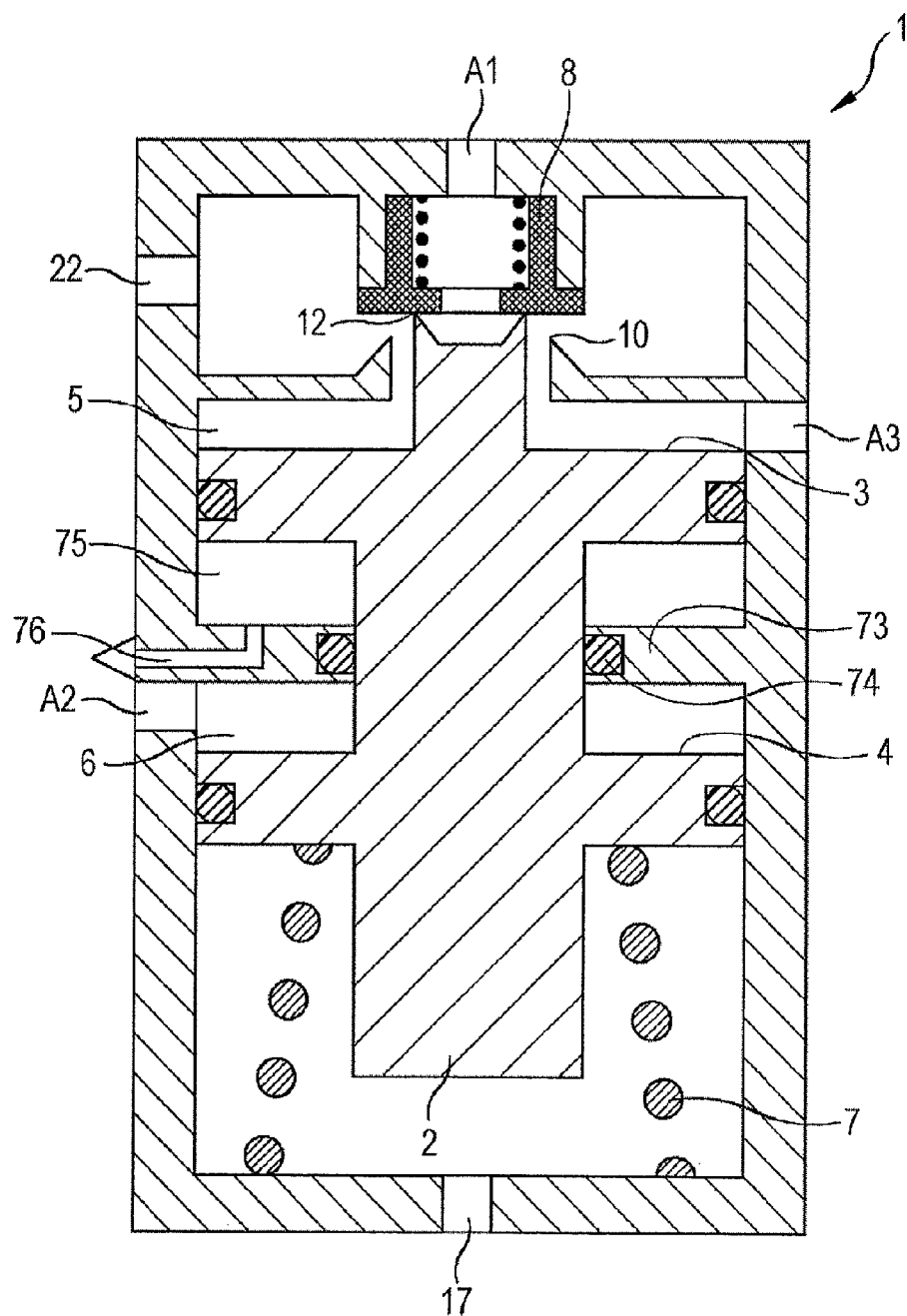
FIG. 14 shows a second illustrative embodiment of a parking brake valve with two piston faces situated in series.

FIG. 14 shows a variant of the parking brake valve 1 having the ports A1, A2 and A3, which can be used in the parking brake device in FIGS. 1 to 13. In contrast to the illustrative embodiments in FIGS. 1 to 13, this is a parking brake valve having a piston which has two piston faces 3 and 4 which are situated in series and which delimit the two spaces 5 and 6. The two piston faces 3 and 4 therefore have the same outside diameter. It is clear to a person skilled in the art that the stepped piston shown in FIGS. 1 to 13 can perform the same functions as the parking brake valve in FIG. 14. A piston as shown in FIG. 14 has the advantage over a stepped piston of a slimmer construction, while the stepped piston has the advantage of a shorter construction.

The parking brake valve 1 in FIG. 14 also has a partition wall 73 with a seal 74, which forms a further space 75 connected by an opening 76 to ambient pressure in order to ensure that the piston 2 can move.

Finally, it may be noted that the pistons 8, 37 and 58 described above can also be sleeves of double seat valves.

The invention claimed is:

1. A parking brake device, comprising:
    a bistable parking brake valve;
    a relay valve;
    a spring brake; and
    electrically actuable valves, wherein the electrically actuable valves selectively connect the parking brake valve to supply pressure or atmospheric pressure;
    wherein an outlet of the parking brake valve controls the relay valve, and the relay valve controls the spring brake,
    wherein the parking brake valve has a movable piston, which is loaded by a spring and has two coaxial piston faces which delimit a first space and a second space,
    wherein supply pressure, atmospheric pressure or a pressure which lies between them and which can be fed to the outlet of the parking brake valve is suppliable to the first space in accordance with the position of the piston, and
    wherein the second space can be selectively connected to supply pressure or atmospheric pressure by an electrically actuable valve.

2. The parking brake device of claim 1, wherein the parking brake valve has a second movable piston which is loaded by a second spring and which forms a first valve seat with a housing wall and a second valve seat with the piston, wherein the valve seats are arranged so that, when a predetermined pressure in the two spaces is exceeded, the first valve seat is closed and the second valve seat is opened and, in this case, supply pressure passes from a first port of the parking brake valve into the first space and hence to the relay valve.

3. The parking brake device of claim 2, wherein the first port of the parking brake valve is selectively connectable to supply pressure or atmospheric pressure by at least one valve.

4. The parking brake device of claim 1, wherein a second port, which is connected to the second space, is selectively connectable to supply pressure or atmospheric pressure by means of an electrically controllable valve.

5. The parking brake device of claim 1, wherein pressure sensors are connected to at least one of the first port of the parking brake valve, the outlet of the parking brake valve, and the outlet of the relay valve.

6. The parking brake device of claim 1, wherein the parking brake valve has a stepped piston having two coaxial piston faces.

7. The parking brake device of claim 1, wherein the electrically actuable valves are solenoid valves.

8. The parking brake device of claim 1, wherein pressure sensors are connected to at least one of the first port of the parking brake valve, the outlet of the parking brake valve, and the outlet of the relay valve, and wherein the parking brake valve has a stepped piston having two coaxial piston faces, and wherein the electrically actuable valves are solenoid valves.

9. A parking brake device, comprising:
a bistable parking brake valve;
a relay valve;
a spring brake; and
electrically actuable valves, wherein the electrically actuable valves selectively connect the parking brake valve to supply pressure or atmospheric pressure;
wherein an outlet of the parking brake valve controls the relay valve, and the relay valve controls the spring brake,
wherein the parking brake valve has a movable piston, which is loaded by a spring and has two coaxial piston faces which delimit a first space and a second space,
wherein supply pressure, atmospheric pressure or a pressure which lies between them and which can be fed to the outlet of the parking brake valve is suppliable to the first space in accordance with the position of the piston,
wherein the second space can be selectively connected to supply pressure or atmospheric pressure by an electrically actuable valve,
wherein the parking brake valve has a second movable piston which is loaded by a second spring and which forms a first valve seat with a housing wall and a second valve seat with the piston, wherein the valve seats are arranged so that, when a predetermined pressure in the two spaces is exceeded, the first valve seat is closed and the second valve seat is opened and supply pressure passes from a first port of the parking brake valve into the first space and hence to the relay valve, and
wherein the valve seats are arranged so that, when a predetermined pressure in both spaces is undershot, the first valve seat opens and the second valve seat closes and the first space and hence a third port are connected to atmospheric pressure via an opening of the parking brake valve.

10. The parking brake device of claim 9, wherein a second port, which is connected to the second space, is selectively connectable to supply pressure or atmospheric pressure by an electrically controllable valve.

11. The parking brake device of claim 9, wherein the first port of the parking brake valve is selectively connectable to supply pressure or atmospheric pressure by at least one valve.

12. The parking brake device of claim 9, wherein pressure sensors are connected to at least one of the first port of the parking brake valve, the outlet of the parking brake valve, and the outlet of the relay valve.

13. The parking brake device of claim 9, wherein the parking brake valve has a stepped piston having two coaxial piston faces.

14. The parking brake device of claim 9, wherein the electrically actuable valves are solenoid valves.

15. The parking brake device of claim 9, wherein pressure sensors are connected to at least one of the first port of the parking brake valve, the outlet of the parking brake valve, and the outlet of the relay valve, and wherein the parking brake valve has a stepped piston having two coaxial piston faces, and wherein the electrically actuable valves are solenoid valves.

16. A parking brake device, comprising:
a bistable parking brake valve;
a relay valve;
a spring brake; and
electrically actuable valves, wherein the electrically actuable valves selectively connect the parking brake valve to supply pressure or atmospheric pressure;
wherein an outlet of the parking brake valve controls the relay valve, and the relay valve controls the spring brake,
wherein the parking brake valve has a movable piston, which is loaded by a spring and has two coaxial piston faces which delimit a first space and a second space,
wherein supply pressure, atmospheric pressure or a pressure which lies between them and which can be fed to the outlet of the parking brake valve is suppliable to the first space in accordance with the position of the piston,
wherein the second space can be selectively connected to supply pressure or atmospheric pressure by an electrically actuable valve, and
wherein the outlet of the parking brake valve is additionally connected to a trailer test valve, the pneumatic control inlet of which is connected by a shuttle valve to the higher of the pressures at a first port and at a second port.

17. The parking brake device of claim 16, wherein the trailer test valve is a slide valve or a double seat valve.

18. The parking brake device of claim 16, wherein a pressure medium inlet of the trailer test valve is connected to the outlet of the relay valve.

19. A parking brake device, comprising:
a bistable parking brake valve;
a relay valve;
a spring brake; and
electrically actuable valves, wherein the electrically actuable valves selectively connect the parking brake valve to supply pressure or atmospheric pressure;
wherein an outlet of the parking brake valve controls the relay valve, and the relay valve controls the spring brake,
wherein the parking brake valve has a movable piston, which is loaded by a spring and has two coaxial piston faces which delimit a first space and a second space,
wherein supply pressure, atmospheric pressure or a pressure which lies between them and which can be fed to the outlet of the parking brake valve is suppliable to the first space in accordance with the position of the piston,
wherein the second space can be selectively connected to supply pressure or atmospheric pressure by an electrically actuable valve, and
wherein a shuttle valve, the first inlet of which is connected to the outlet of the parking brake valve and the second inlet of which is connected to a pressure medium line of a service brake, is inserted between the outlet of the parking brake valve and the pneumatic control inlet of the relay valve, wherein the shuttle valve directs the higher of the pressures at the two inlets thereof to the control inlet of the relay valve.

20. A parking brake device, comprising:

a bistable parking brake valve;

a relay valve;

a spring brake; and electrically actuable valves, wherein the electrically actuable valves selectively connect the parking brake valve to supply pressure or atmospheric pressure;

wherein an outlet of the parking brake valve controls the relay valve, and the relay valve controls the spring brake, wherein the parking brake valve has a movable piston, which is loaded by a spring and has two coaxial piston faces which delimit a first space and a second space, wherein supply pressure, atmospheric pressure or a pressure which lies between them and which can be fed to the outlet of the parking brake valve is suppliable to the first space in accordance with the position of the piston, wherein the second space can be selectively connected to supply pressure or atmospheric pressure by an electrically actuable valve, and wherein the outlet of the relay valve is connected to one inlet of a shuttle valve, a second inlet of which is connected to a pressure medium from a service brake and the outlet of which is connected to the spring brake.

* * * * *